United States Patent
Bradshaw

[11] 3,842,288
[45] Oct. 15, 1974

[54] BLOWER MOTOR CONTROL CIRCUIT
[75] Inventor: Darrell L. Bradshaw, Norridge, Ill.
[73] Assignee: Dole Refrigerating Company, Chicago, Ill.
[22] Filed: Oct. 25, 1973
[21] Appl. No.: 409,715

[52] U.S. Cl.................. 307/10 R, 320/39, 307/66
[51] Int. Cl............................................. H02j 7/00
[58] Field of Search............ 307/10 R, 66, 9, 10 BP; 318/139

[56] References Cited
UNITED STATES PATENTS
2,972,057   2/1961   Boehmer et al.................. 307/10 R
3,753,072   8/1973   Jurgens.............................. 320/39

Primary Examiner—Robert K. Schaefer
Assistant Examiner—M. Ginsburg
Attorney, Agent, or Firm—Kinzer, Plyer, Dorn & McEachran

[57] ABSTRACT

A control circuit for the blower motor of a cold-plate refrigeration system in a vehicle providing continuous operation from the vehicle battery system and means for automatically charging the vehicle battery that connects to a standard AC voltage supply.

7 Claims, 1 Drawing Figure

PATENTED OCT 15 1974
3,842,288
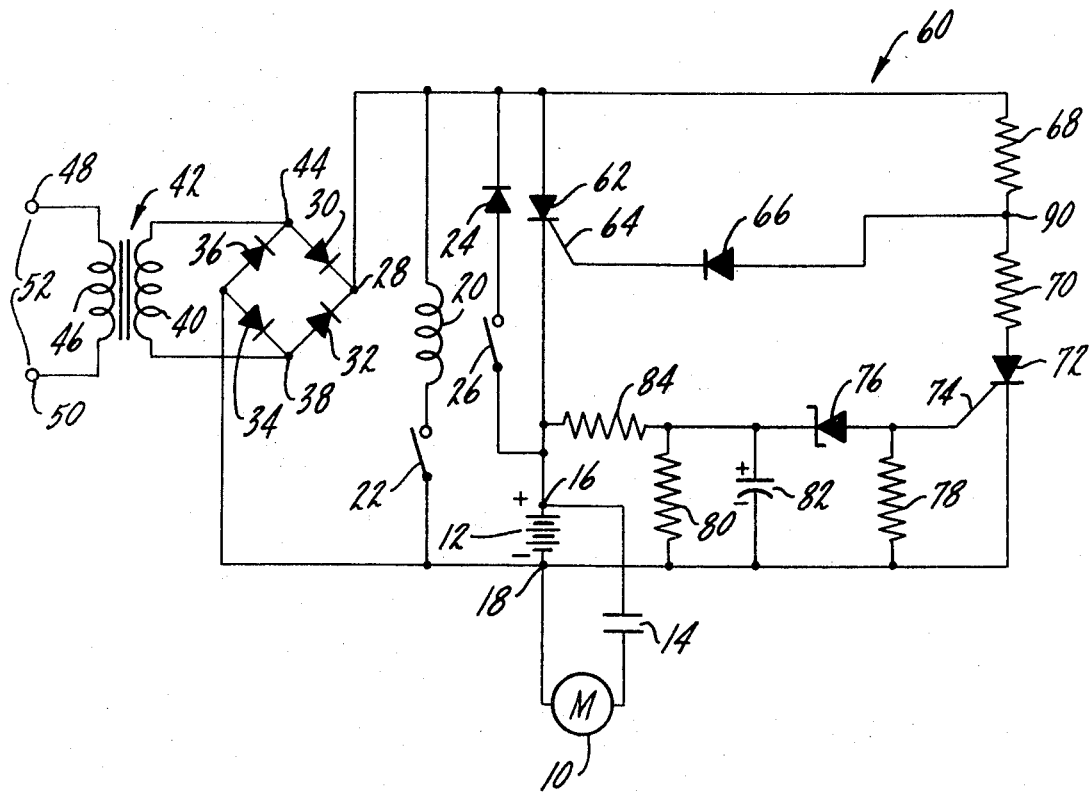

BLOWER MOTOR CONTROL CIRCUIT

BACKGROUND OF THE INVENTION

The present invention relates to the field of refrigeration and heat transfer units in trucks or motor vehicles, or vehicles of all types, and more particularly to a blower motor control circuit associated with a refrigeration or heat transfer system.

Many refrigeration systems or cooling units for refrigerated trucks utilize a blower unit in conjunction with refrigeration plates, which may be of eutectic design, for maintaining the proper flow of air and temperature within the refrigerated space in a vehicle.

The refrigerant plates that are utilized in such a vehicle system might be of the design such s shown in U.S. Pat. No. 2,875,595, issued Mar. 1, 1959, or U.S. Pat. No. 2,889,694, issued June 9, 1959. Refrigeration plates of this type are specifically designed to provide excellent heat transfer, and it is common for such plates to include a coil system delivering refrigerant throughout the plate to cool or freeze a substance contained within the cold plate structure. The heat transfer characteristic of the frozen or chilled refrigeration plate structure absorbs the heat in the truck body as the blower motor provides circulation of the air contained in the truck body. A liquid eutectic is normally employed in the "plate structure," with a suitable liquid refrigerant circultion system located throughout the coldplate structure and operating in conjunction with a compressor condensor unit which may or may not be on the vehicle itself.

Previous systems have incorporated blower untis within the refrigerating plate structures or located near the plates, with various control circuits being provided for operation from the vehicle battery or from an AC external source. Such a system is shown in U.S. Pat. No. 2,972,057, issued Feb. 14, 1961. Other such refrigeration systems utilize a blower motor that operates only on DC current, and switch the motor from vehicle battery operation to an external source such as a DC voltage rectified from an AC supply line when the vehicle is idle.

It is common in refrigerated truck systems for the blower motor to operate whenever the truck is in operation, via the ignition switch. Most systems utilize thermostats that control the blower operation with additional switches also being provided to allow blower operation only when the truck doors are closed, to conserve cold air in the truck body. When the ignition switch is turned on and the thermostat determines that the blower operates, assuming that the truck doors are closed, the blower fan will start operating, and will continue until either the thermostat or the door or the ignition switch discontinue the operation. The blower motor continues operation on the vehicle or truck battery throughout the daily operation. During the course of a week this can substantially reduce the available voltage at the battery. This condition is further aggravated by the operation of accessories such as lights, windhsield wipers, radios, air coditioners, and others.

It has become common practice, during the evening or idle hours of the vehicle, to connect the blower motor of the refrigeration system in the truck at the dock or garage to a rectified DC voltage to allow operation of the blower motor similar to that when the truck is operating. If the thermostat and the door switches are closed, operation of the blower motor will occur to maintain the desired temperature in the truck body. Similarly, an AC voltage could be directly connected through the electrical system of the truck and refrigeration system to operate a blower motor that is designed to operate on AC or DC voltage. In either approach, the design of the control system to switch the blower motor between AC and DC operation, or the control circuit to switch the DC blower motor from vehicle battery to external rectified AC supply operation, is complicated, expensive, and prone to normal part and system failures. Further, such systems for operating the blower motors during the idle hours to maintain temperature in the truck body do not prevent a discharge condition of the battery. With such systems it is possible that the vehicle battery will be continuously discharged during the day, with the blower motor operating at night off external supply, but the vehicle battery which has been discharged and sitting idle all night may be insufficien to operate the vehicle at the beginning of the next day.

SUMMARY OF THE INVENTION

It is a principal object of the present invention, therefore, to provide an improved blower motor control circuit that is continuously supplied from the vehicle battery whether the vehicle is operating, or connected at a dock or garage.

Another object is a blower motor control circuit in which the blower motor is of simplified design requiring only DC operation.

Another object is a blower motor control circuit that is connected to an AC supply source when the vehicle is idle or inoperative, to provide automatic charging of the vehicle battery and also operation of the blower motor.

Another object is a blower motor control circuit that automatically determines a proper charge on the vehicle battery when the AC external source is connected, and also provides blower motor operation without complicated supply switching of the blower motor circuitry from the vehicle battery to the external source.

Other objects will appear from time to time in the ensuing specification, drawing and claims.

BRIEF DESCRIPTION OF THE DRAWINGS

The blower motor control circuit shown in the drawing includes a DC blower motor 10 connected across the vehicle battery 12 through a pair of contacts 14. The conventional vehicle battery 12, which may be 6 volts or 12 volts, has a positive terminal 16 and a negative or ground terminal 18. It should be realized that although a negative ground system is shown, a positive ground system could be similarly utilized. The contacts 14 controlling the operation of the motor 10 are associated with a relay controlled by the energizing of relay coil 20. The contacts 14 are arranged such that they are normally open when the relay coil 20 is de-energized, and closed when the coil is energized, providing battery voltage across the blower motor 10. The relay coil 20 is connected in series with a pair of contacts 22 to the ground terminal 18 of the vehicle battery 12. The other end of the relay coil 20 is connected to the cathode of a diode 24 whose anode is connected through the ignition switch 26 of the vehicle to the positive terminal 16 of the battery 12. As in conventional truck refrigeration systems, the blower motor is located in the truck body along with the thermostat. The contacts 22 in series with the relay coil 20 represent the thermostat switch contacts and also other control switches such as door closing switches to control the energizing of relay coil 20 and by means of its contacts 14, the blower motor 10.

Also connected to one end of the relay coil 20 and the cathode of diode 24 is the output 28 of a diode bridge rectifier including rectification diodes 30, 32, 34 and 36. The cathodes of diodes 30 and 32 are connected to the output 28 of the bridge. Similarly in ring fashion, the anode of diode 32 is connected to the cathode of diode 34, and the anode of diode 34 is connected to the anode of diode 36, whose cathode is connected to the anode of diode 30. The anodes of diodes 34 and 36 are connected to the ground terminal 18 of the vehicle battery 12. The junction 38, formed by the cathode of diode 34 and the anode of diode 32, is connected to one side of a secondary coil 40 of an AC transformer 42. The other end of secondary winding or coil 40 is connected to the junction 44 formed by the anode of diode 30 and the cathode of diode 36. The AC transformer 42 also includes a primary winding 46 forming the AC supply input at terminals 48 and 50. A conventional AC line cord is connected to the AC terminals 48 and 50 for connection with a suitable AC supply voltage, such as 110 or 220 volts, as determined by the particular system. The AC lead pair 52 at the terminals 48 and 50 extends from the vehicle to be connected to the AC supply source. The physical configuration of the AC lead pair 52 could of course be a connector carried by the vehicle body and an AC cord connected to the plug or socket when external operation is desired. In any event, the AC voltage is supplied at the terminals 48 and 50 to the transformer 42.

The blower motor control circuitry of the present invention also includes a battery charging circuit shown generally at 60 in the drawing. A charging SCR 62 of the battery charging circuit 60 has its anode connected to the output 28 of the rectifier bridge and its cathode connected to the positive terminal 16 of the vehicle battery 12. The gate lead 64 of SCR 62 is connected to the cathode of a diode 66 whose anode is connected to the junction of two divider resistors 68 and 70. The other end of resistor 68 is connected to the output 28 of the rectifier bridge. The other end of resistor 70 is connected to the anode of an SCR 72 whose cathode is connected to the ground terminal 18 of vehicle battery 12. The gate lead 74 of control SCR 72 is connected to the anode of a zener diode 76 and also to the ground terminal 18 through a resistor 78. The cathode of zener diode 76 is connected to the ground terminal 18 through the parallel combination of a resistor 80 and a capacitor 82. The cathode of zener diode 76 is also connected to the positive terminal 16 of the vehicle battery 12 through a bias resistor 84.

In operation, the blower motor 10 is connected so as to be supplied from the vehicle battery 12, whether the truck is operating or is plugged in at the dock or garage. When the thermostat determines that the blower should operate, and the truck door switches are closed, switch means 22 will be closed, energizing the relay coil 20, either when the ignition switch 26 is closed, placing the vehicle battery across the relay coil 20, or when the external AC supply at 52 is connected. When the relay coil 20 is energized, the contacts 14 close, providing vehicle battery across the DC blower motor 10 so as to operate the blower. The blower motor 10 continues operating as determined by the thermostat and door closure which is operated by switch means 22. It should be noted that the blower motor 10 always operates by direct supply from the vehicle battery 12. The motor 10 is operated only when the contacts 14 are closed by means of energizing the relay coil 20. When the external AC supply is not connected at 52, the relay coil 20 can be energized only by the closing of the ignition switch 26 which represents the blower operation while the truck is on the road or during the vehicle's normal operating use.

When the vehicle or truck is connected to the external AC supply at 52, the AC transformer 42 and the rectification bridge formed by diodes 30, 32, 34 and 36 provide a DC voltage suitable for battery charging purposes at the output 28. Since the truck or vehicle is plugged into the external AC supply, it will be assumed that the truck is idle and the ignition switch 26 is not closed. This represents the normal idle period of the vehicle or truck as parked in a garage or located near a dock. Assuming that switch means 22 is closed, the thermostat determines that blower operation is required, and the door closure switch indicates the doors are closed, the relay coil 20 will be energized by the DC voltage at 28 rectified from the AC supply input 52. As before, when the relay coil 20 is energized, the blower motor 10 is operated by means of contact closure at 14, with the vehicle battery 12 placed across the motor. The motor then continues to operate dependent upon the thermostat and door closure switch means 22 and also dependent upon the AC supply source 52 remaining connected.

Since the blower motor 10 is operating from the vehicle battery 12, the battery may be discharged below normal cell voltage of approximately 13, or 13.5 volts. The battery charging and sensing circuit means 60 monitors the vehicle battery voltage between terminals 16 and 18 to determine when battery charging is required, which is defined as the battery voltage below any predetermined value such as 13 or 13.5 volts.

Control SCR 72 of charging means 60 monitors the battery voltage through the bias sensing network formed by resistors 78, 80 and 84, stabilizing capacitor 82 and zener diode 76. The values of resistors 78, 80 and 84 and the zener voltage of diode 76 are chosen to prevent conduction of control SCR 72 whenever the battery voltage between terminals 16 and 18 of the vehicle battery 12 falls below the predetermined minimum. This is accomplished by providing a gate voltage at the gate 74 of control SCR 72 to control conduction of SCR 72. The gate voltage controlling conduction of SCR 72 appears between the gate lead 74 and the cathode of SCR 72, which is the voltage across resistor 78.

Whenever the control SCR 72 conducts, when the battery voltage is high, a voltage divider network is formed by the resistors 68 and 70 in series with SCR 72 between the DC voltage output 28 and the ground terminal 18 of the system. In this non-conducting mode of SCR 72, the bridge output voltage at 28 is connected to the gate lead 64 of charging SCR 62 through diode 66 and resistor 68.

Charging SCR 62 will conduct whenever its gate lead 64 is more positive than the cathode lead voltage which is the positive terminal 16 of the vehicle battery 12.

Whenever control SCR 72 is not in conduction, the gate to cathode voltage of charging SCR 62 will be positive, causing conduction of the charging SCR 62. When the charging SCR 62 conducts, the battery 12 is charged. Therefore, whenever the battery voltage is below a predetermined minimum level, control SCR 72 will not be conducting, which, by means of divider resistors 68 and 70, causes conduction of the charging SCR 62 charging the battery 12. When the battery voltage between terminals 16 and 18 of the vehicle battery 12 is high, above the predetermined minimum, the control SCR 72 will conduct via the voltage at gate 74. This causes the voltage at junction 90 of the voltage divider and the gate lead 64 of charging SCR 62 to be negative with respect to the cathode voltage of SCR 62, which is the positive terminal 16 of the battery. Therefore, SCR 62 will not conduct, and no charging will take place.

In reality, the output voltage 28 is a pulsating wave form with AC and DC components from the full wave bridge rectifier. Therefore, when the battery terminal voltage is low, calling for charging, SCR 72 will be nonconducting, and SCR 62 will conduct during the time of the AC wave form when the anode and gate leads of SCR 62 are at higher positive potentials than the terminal voltage 16. As the battery voltage varies in the area of approximately 12.5 to 14 volts, the angle of conduction of SCR 62 will also vary on the AC wave form at 28. The peak AC voltage at output 28 will normally be in the range of 18 volts so as to insure adequate charging voltage. It should also be noted that the values of the bias resistors 78, 80 and 84 in conjunction with the zener voltage of diode 76, determine the period of conduction for battery charging through the control of the conduction of SCR 72 and SCR 62. Stabilizing capacitor 82 is provided in the zener biasing network to smooth or filter out the peaks of the applied pulsating voltage from the rectifier 28 so as to deliver a stable DC voltage to the zener diode 76 and therefore the gate lead 74 of SCR 72. Diode 24 provides a current conduction path for energizing relay coil 20 from the battery 12 when the ignition switch 26 is closed, while also preventing current conduction in the reverse direction from the externally rectified voltage 28 to the battery 12 if the ignition switch 26 is closed while the external AC supply at 52 is connected. Similarly, diode 66 provides for proper conduction paths between the voltage divider junction 90 and the gate lead 64 of SCR 62.

As an illustrative example of the invention, the following combination of circuit elements has been found to be satisfactory, although they should not be interpreted as being limited to those values shown.

| Resistor 68 | 27 ohms |
|---|---|
| Resistor 70 | 27 ohms |
| Resistor 78 | 1K ohms |
| Resistor 80 | 470 ohms |
| Resistor 84 | 150 ohms |
| Capacitor 82 | 100 mfd |
| Diode 76 | 8.2v zener diode |

The blower motor control circuit of the present invention provides for DC blower motor operation from the vehicle battery when the ignition switch of a vehicle is operated, or when an external AC supply is connected. During one of these conditions, the blower motor operates under the control of the thermostat and door closure switch means to provide proper temperature control and air circulation for the refrigerant or cold-hold plates located in the vehicle or truck body. In this manner, the blower motor can be of simplified DC design, rather than an AC-DC combination of the charging systems in the prior art, where the blower motors would switch from vehicle battery operation to AC operation. Further, since the blower motor operates continuously from he vehicle battery, there is no necessity for switching the blower motor supply connections from the vehicle battery over to an auxiliary external supply connection when the truck or vehicle is not being used and parked at a dock. The blower control circuit of the present invention also provides for automatic charging of the vehicle battery independent of the blower motor operation whenever the external AC supply source is connected.

The control circuit of the present invention does not require any elaborate switch-over or switching control operations to be performed when the vehicle is to be switched from operative to idle, or idle to operative condition, such as when the vehicle is to be taken out on the road in the morning or brought back to the dock at night. A simple AC connection is all that is required to switch over from operative to idle vehicle condition to allow blower motor operation and charging of the battery. In this manner, no down-time or breakdowns are encountered, since the vehicle battery is continuously kept to a high charge condition. The AC supply connection could of course also be connected in common with an external connection, which may be provided for the refrigeration system in a vehicle which also uses external AC connection during idle condition.

Whereas the preferred form of the invention has been shown and described herein, it should be realized that there may be many modifications, substitutions, and alterations thereto without departing from the teachings of this invention.

The embodiments of the invention in which an exclusive property or privilege is claimed are described as follows:

1. In a control circuit for operating a DC blower motor in a refrigerated vehicle or the like having a vehicle battery as a DC source for the blower motor,
blower energizing means for controlling the application of the vehicle battery to the blower motor, charging control means for rectifying and applying an external AC supply voltage to the vehicle battery to maintain a predetermined charging condition, and vehicle ignition switch means,
said blower energizing means including control switch means and a relay, said relay including a coil and a pair of relay contacts, said relay contacts being connected to control the application of the vehicle battery to the blower motor, said relay coil being connected in series combination with said ignition switch means, the vehicle battery and said control switch means, said relay contacts energizing the blower motor when said ignition switch means and said control switch means are closed.

2. The control circuit of claim 1 further characterized in that said charging control means includes a charging supply output, said charging supply output being connected across the series connection of said relay coil, and said control switch means to energize said relay coil when said control switch means are closed, thereby providing closure of said relay contacts to energize the blower motor.

3. The control circuit of claim 2 further characterized in that said control switch means includes thermostatic switch means for providing a closure indication when the temperature is above a predetermined desired operating temperature in the refrigerated section of the vehicle.

4. The control circuit of claim 3 further characterized in that said control switch means includes door closure switch means that provide a closure indication only when all doors of the refrigerated section of the vehicle are closed.

5. The control circuit of claim 2 further characterized in that said ignition switch means includes an ignition switch and diode protection means, said diode protection means operably connected in series with said ignition switch to prevent current flow from the charging supply output through the ignition switch means to the vehicle battery.

6. The control circuit of claim 5 further characterized in that said charging control means includes control SCR means and charging SCR means, said control SCR means being operably connected to monitor the vehicle battery voltage and to control conduction of said charging SCR means, said charging SCR means including a charging SCR operably connected with its anode lead and cathode lead connected between the vehicle battery and the charging supply output.

7. The control circuit of claim 6 further characterized in that said control SCR means is connected to control the gate lead of said charging SCR, said anode of said charging SCR being connected to the charging supply output, and said cathode being connected to the positive side of the vehicle battery.

* * * * *